United States Patent [19]

Döell

[11] Patent Number: 4,511,016

[45] Date of Patent: Apr. 16, 1985

[54] LUBRICATING SYSTEM FOR GAS TURBINE ENGINES

[75] Inventor: Hermann Döell, Munich, Fed. Rep. of Germany

[73] Assignee: MTU Motoren-und Turbinen-Union Muenchen GmbH, Munich, Fed. Rep. of Germany

[21] Appl. No.: 549,413

[22] Filed: Nov. 7, 1983

[30] Foreign Application Priority Data

Nov. 16, 1982 [DE] Fed. Rep. of Germany ....... 3242366

[51] Int. Cl.³ .................. F16N 29/02; F01M 11/12
[52] U.S. Cl. .................. 184/6.11; 60/39.08; 184/6.2; 184/6.22; 184/6.23; 184/6.28
[58] Field of Search ............ 184/6, 6.2, 6.3, 6.4, 184/6.11, 6.21, 6.22, 6.23, 6.24, 6.28, 7.1, 26, 104 R; 60/39.08; 137/43, 45; 244/135 R; 123/196 R, 196 S

[56] References Cited

U.S. PATENT DOCUMENTS

| | | | |
|---|---|---|---|
| 1,997,700 | 4/1935 | Short | 184/6.4 |
| 2,239,098 | 4/1941 | Hunter | 184/6.2 X |
| 2,613,498 | 10/1952 | Prendergast | 60/39.08 |
| 3,451,214 | 6/1969 | Bradley | 60/39.08 X |
| 3,554,322 | 1/1971 | Deutschmann et al. | 184/6.2 |
| 3,626,693 | 12/1971 | Guillot | 60/39.08 X |
| 3,779,345 | 12/1973 | Barnes et al. | 184/6.4 |
| 4,012,012 | 3/1977 | Ligler | 184/6.3 X |
| 4,030,566 | 6/1977 | Cobb et al. | 184/6.2 |
| 4,105,093 | 8/1978 | Dickinson | 184/6.11 |
| 4,153,141 | 5/1979 | Methlie | 184/6.11 X |
| 4,171,611 | 10/1979 | Hueller | 184/6.11 X |
| 4,197,870 | 4/1980 | Hildebrandt et al. | 137/45 X |
| 4,373,421 | 2/1983 | Camboulives et al. | 60/39.08 X |
| 4,390,082 | 6/1983 | Swearingen | 184/6.11 X |

FOREIGN PATENT DOCUMENTS

| | | | |
|---|---|---|---|
| 702551 | 1/1965 | Canada | 184/6.11 |
| 2743994 | 8/1979 | Fed. Rep. of Germany . | |
| 708099 | 4/1954 | United Kingdom | 184/6.2 |
| 2084266 | 4/1982 | United Kingdom . | |
| 731170 | 5/1980 | U.S.S.R. | 60/39.08 |

OTHER PUBLICATIONS

A publication entitled "Lubrication", published by the Texas Company (Texaco), vol. XL, Apr. 1954.

Primary Examiner—David H. Brown
Assistant Examiner—John E. Griffiths
Attorney, Agent, or Firm—W. G. Fasse; D. H. Kane, Jr.

[57] ABSTRACT

Components, such as bearings, of gas turbine engines especially for aircraft are lubricated by a lubricant supply system including a main lubricant circulating circuit and an auxiliary lubricant circulating circuit for assuring a sufficient lubricant supply to the lubricating chamber or chambers under all operating conditions including those causing extremely rapid and locally differing displacements of the lubricant fluid in its supply tank. The main lubricant circulating circuit with its pumps, lubricating chamber or chambers, cooler, air separator and accumulator is operatively connected to the component being lubricated and is effective during normal and critical flight conditions. The auxiliary circulatory circuit with its lubricant supply tank and its pump is operatively connected to the main circulatory circuit for supplying lubricant into the main circuit. The auxiliary circulatory circuit is effective during the engine start-up and for replenishing lubricant into the main circuit during normal flight conditions.

8 Claims, 1 Drawing Figure

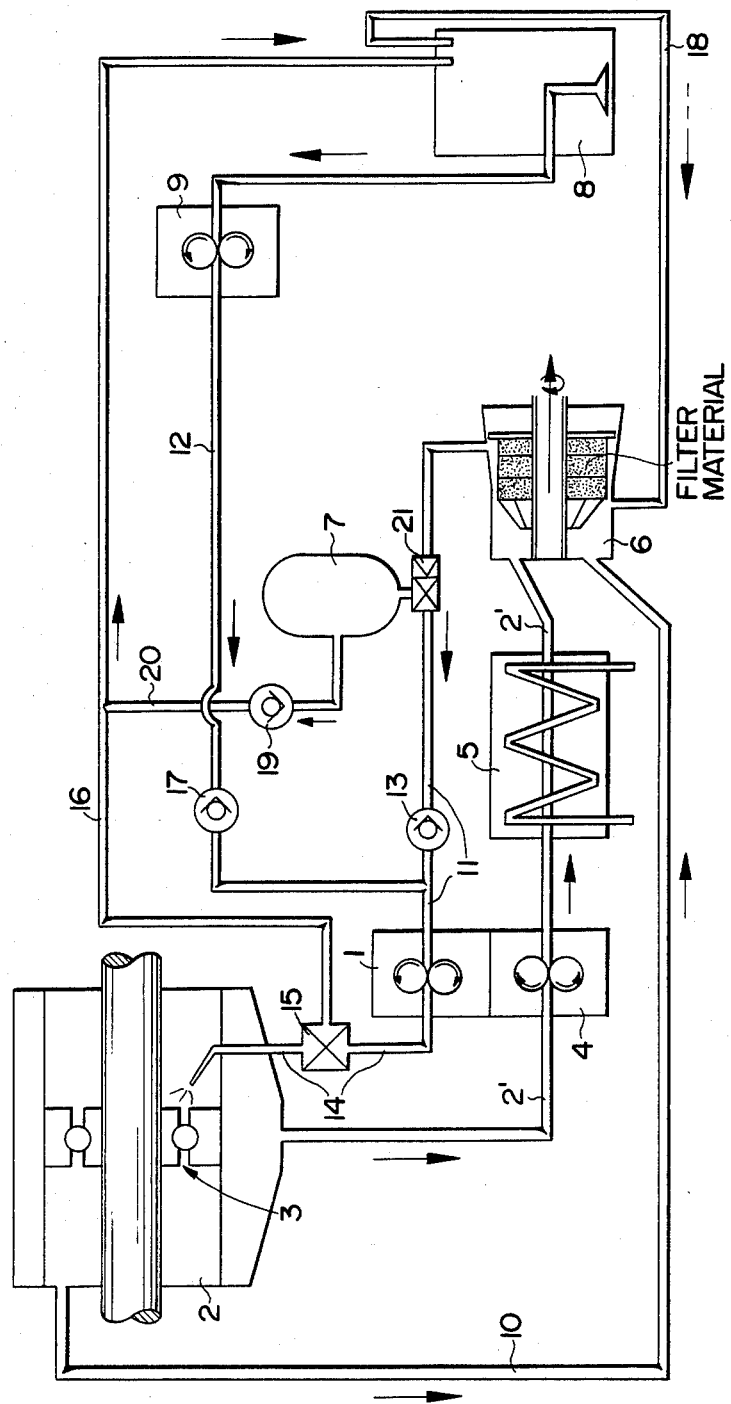

LUBRICATING SYSTEM FOR GAS TURBINE ENGINES

FIELD OF THE INVENTION

This invention relates to a liquid supply system for gas turbine engines, more particularly to a lubricant or oil supply system for gas turbine jet engines of aircraft, wherein a fluid lubricant, such as oil, is supplied from an oil tank to at least one lubricating point of an engine. A lubricant pressure pump feeds the lubricant from the tank to the lubricating point. An oil scavenging pump returns the lubricant to the tank whereby the returning lubricant passes first through a lubricant cooler and next through a lubricant-air separator.

DESCRIPTION OF THE PRIOR ART

In the following text the terms lubricant and oil are used interchangeably. In a system as just described above the spent oil flows from the oil-air separator back into the tank. However, under extreme flight attitudes and conditions near zero g or negative g, the respective oil level in the tank is rapidly displaced to possibly locally greatly varying degrees such that instead of oil, merely air or oil-air mixtures are supplied from the tank, whereby the lubricant supply may be interrupted and a proper supply of lubricant is no longer ensured. As a result of such interruption of the flow of lubricating oil under the mentioned extreme aircraft attitudes, bearing damage and conceivably consequential damage to the engine may result, whereby the engine could become inoperative.

Attempts have been made heretofore to resolve the above problem by providing lubricating systems incorporating gravity controlled pendulum valve systems, flexible snorkels and other devices employed, among others, in conjunction with systematically distributed vent lines in the tank intended to alternately assure the venting and lubricating function despite extremely varying aircraft attitudes.

Thus, German Patent Publication (DE-AS) No. 2,743,944 or U.S. Pat. No. 4,197,870 discloses a device for venting tanks subject to dangerous pressure surges in an aircraft. According to this prior art, vent pipes are arranged inside the liquid reservoir or tank so that the mouth of at least one vent pipe is located above and so that the mouth of at least one further vent pipe is located below the liquid level in the tank, whereby the respective other ends of the vent pipes open into separate chambers sealed from the interior of the tank. In this arrangement the chambers are arranged for cooperation with a rotary slide valve which is controllable by an acceleration response weight operated in response to flight conditions. Such valve is equipped with control slots which are staggered relative to one another in such a way that if flow is allowed through the at least one vent pipe above the liquid level, flow through the at least one further vent pipe below the liquid level is prevented.

The above mentioned prior art devices have a disadvantage in that they are mechanically complex and prone to trouble, and in that at the initially mentioned flight conditions the lubricating fails. Especially at zero g, the supply of oil is no longer safely ensured by the prior art devices. Besides, practical application of the device according to German Patent Publication (DE-AS) No. 2,743,944 or U.S. Pat. No. 4,197,870 has shown that the oil, under the mentioned extreme flight conditions, shifts more rapidly in the tank or reservoir than the pendulum coupled to the rotary valve will oscillate. Accordingly, the inertia of the centrifugal pendulum coupled to the rotary valve is too large to ensure a proper venting and supply of lubricant to the equipment under extreme flight conditions and to handle the resulting extremely rapid shifting of the liquid or lubricant in the tank. Another disadvantage of the mentioned prior art device is that the rotary valve may jam or that vibrations will cause the rotary valve to hunt, which also makes the proper supply of oil rather questionable, especially in the presence of zero g loads.

OBJECTS OF THE INVENTION

In view of the above it is the aim of the invention to achieve the following objects singly or in combination:

to avoid the above problems and the disadvantages of the prior art;

to provide a lubrication or oil supply system for aircraft which assures a proper supply of liquid or oil to engine components and accessories despite extreme aircraft attitudes and under extreme flight conditions involving near zero, zero, or even negative g loads; and to match the quantity of the lubricant supply to the lubricant requirements under all operating conditions of an aircraft.

SUMMARY OF THE INVENTION

The lubricating system of the invention comprises a lubricant circulating circuit having a first circuit portion which is used during "normal" and during "critical" flight operations, and a second circuit portion which is used during the starting phase of the engine and for replenishing the oil consumed during "normal" flight operation. The first circuit portion comprises essentially an oil pressure pump, a lubricating chamber or chambers of the member to be lubricated, a scavenging, return flow suction pump, a lubricant cooler, a lubricant-air separator, and a separate accumulator or lubricant storage device which is switched into the first circuit portion as required. The second circuit portion comprises essentially the common oil supply tank and an additional, separate oil pressure pump to feed oil into the first circuit portion.

In accordance with the present invention the first circuit portion covers normal flight service and extreme or "critical" flight phases such that especially during these critical phases under zero or even negative g loads a proper lubricant supply is ensured by the first circuit portion. The second circuit portion is intended exclusively for the starting phase and for replenishing consumed oil, as needed, during normal flight service.

The special advantage of the present invention over the prior art is that it eliminates the need for gravity controlled venting and oil supply devices. By making the first circuit portion independent of the second, oil supply circuit portion during any critical phase of operation, the first circuit portion does not depend for its effectiveness on the instantaneous condition of the lubricant level in the lubricant supply tank in the second circuit portion. On the other hand, the second circuit portion is fully effective during normal operations without any gravity controlled devices to satisfy even a high demand for lubricant.

In flight service, when said extreme flight conditions may arise, the oil flows from the oil-air separator directly to the associated oil supply pump, whereby it is the beneficial effect of the accumulator to store excessive amounts of oil contained in the first circuit portion and to dampen irregularities in the first circuit portion. Another substantial advantage is seen in that the lubricating chambers are vented to the atmosphere directly through the oil-air separator.

BRIEF FIGURE DESCRIPTION

In order that the invention may be clearly understood, it will now be described, by way of example, with reference to the single FIGURE of the accompanying drawings showing a hydraulic circuit arrangement of a lubricating system of the invention.

DETAILED DESCRIPTION OF PREFERRED EXAMPLE EMBODIMENTS AND OF THE BEST MODE OF THE INVENTION

The first lubricant circulating circuit portion comprises essentially an oil pressure pump 1, a lubricating chamber 2 of, e.g., a shaft bearing 3 of a gas turbine jet engine, a return suction or scavenging pump 4, an oil cooler 5, an oil-air separator 6 and a separate accumulator or lubricant storage tank 7 to be used a needed. These components are operatively interconnected by hydraulic conduits as shown. The main function of the accumulator 7 is to dampen pressure peaks or irregularities that occur during critical flight phases as a result of oil displacement in the main lubricating circuit.

The second lubricant circulating circuit portion comprises essentially the common oil tank 8 and an additional, separate oil pressure pump 9 for feeding oil into the first circuit portion. The second circuit portion is vented through a vent line 18 leading from the oil tank 8 into the oil-air separator 6 and connected to the first circuit portion through conduits 12 and 16.

The lubricating chamber 2 for the bearing 3 and thus also the first circuit portion are vented through the oil-air separator 6 connected through a conduit 10 to the chamber 2. In this manner the first circuit portion is properly vented under extreme flight conditions. This oil-air separator 6 comprises a centrically arranged vent pipe surrounded by a suitable storage mass for the return oil. A conduit 2' connects the lubricating chamber 2 to the oil-air separator 6. The scavenging pump 4 and the cooler 5 are connected in series in the conduit 2'.

The drawing further shows that an oil outlet of the oil-air separator 6 is connected through a return conduit 11 to a suction inlet of the oil pressure pump 1 of the first circuit portion. The accumulator 7 is operatively connected to the conduit 11 between the oil outlet of the oil-air separator 6 and the inlet of the oil pressure pump 1 of the first circuit portion through a control valve 21, which is simultaneously a check valve or non-return valve, for connecting or disconnecting the accumulator 7, whereby a constant, comparatively moderate flow is maintained even under said critical operating conditions independently of gravity influences. The accumulator 7 is vented to the oil tank 8 through a spill valve 19 in a spill line or conduit 20 connected to the tank return conduit 16. The valve 19 is a non-return valve. The lubricant supply conduit or line 12 of the oil pressure pump 9 for the second circuit portion is connected to the line or conduit 11 directly upstream of the oil pressure pump 1 for the first circuit portion. Check valves 13 and 17 are operatively arranged in line 11 and 12, respectively, upstream of the point where lines 11 and 12 are connected to the suction inlet of pump 1. These valves make sure that the flow direction in both circuits is as indicated by the arrow.

Additionally, a two-way valve 15 is arranged in the feed line 14 between the outlet of the pump 1 of the first circuit portion and the lubricant inlet of the chamber of the bearing 3, to spill excessive amounts of oil, if present, back into the tank 8 through the tank return line 16 as shown in the drawing. Under critical operating conditions the valve 15 closes the return line 16, thereby making the operation of the first circuit portion independent of the operation of the second circuit portion. Simultaneously, the valve 15 ensures the flow of oil to the bearing chamber 2 through the feed line 14, whereby the first circuit portion is a substantially closed circuit under such critical operating conditions.

Although the invention has been described with reference to specific example embodiments, it will be appreciated, that it is intended to cover all modifications and equivalents within the scope of the appended claims.

What is claimed is:

1. A lubricating system for gas turbine engines, comprising a lubricant circulating circuit including lubricating chamber means (2), lubricant pressure pump means (1) and a main supply conduit means (14) operatively connecting said pressure pump means to a pressure input of said lubricating chamber means for lubricating an engine component in said lubricating chamber means, suction pump means (4) operatively connected to a suction output of said lubricating chamber means (2), lubricant air separator means (6) vented to the atmosphere, conduit means (2') operatively connecting said lubricant air separator means (6) to said suction pump means (4), return conduit means (11) operatively connecting said lubricant air separator means (6) back to said pressure pump means (1), and lubricant storage accumulator means (7) operatively connected to said return conduit means (11), said system comprising a further pressure pump means (9), lubricant supply container means (8), and auxiliary conduit means (12) operatively connecting said further pressure pump means (9) to said main supply conduit means (14) of said lubricant circulating circuit for replenishing lubricant from said supply container means (8) only during engine starting and during engine operation under normal flight conditions, said main supply conduit means (14) comprising first valve means (15), said return conduit means (11) comprising second valve means (13, 21), and said auxiliary conduit means (12) comprising third valve means (17), said first, second and third valve means being responsive to variable oil pressures occurring in said respective conduit means for assuring a lubrication in said lubricating chamber means (2) independently of gravity, especially zero gravity, influences under critical flight conditions.

2. The system of claim 1, wherein said lubricating chamber means (2) comprise venting conduit means (10) operatively connecting said lubricating chamber means to said lubricant air separator means (6) for venting said lubricating chamber means to the atmosphere through said lubricant air separator means (6).

3. The system of claim 1, wherein said auxiliary conduit means comprise an auxiliary pressure conduit (12), said third valve means comprises a non-return valve (17) in said auxiliary pressure conduit, and a return auxiliary conduit (16), said auxiliary pressure conduit (12) connecting a pressure outlet of said further pressure pump (9) through said non-return valve (17) to an inlet of said first mentioned pressure pump (1), and said second valve means include a further non-return valve (13) in said return conduit means (11), said further non-return valve (13) being located directly downstream of a point where said auxiliary pressure conduit (12) is connected to said inlet of said first mentioned pressure pump (1).

4. The system of claim 1, wherein said first valve means in said main supply conduit means (14) between said first mentioned pressure pump means (1) and said lubricating chamber means (2) comprises a two-way valve (15) in said main supply conduit means (14), said auxiliary conduit means including an auxiliary return conduit (16) connecting said two-way valve (15) to said lubricant supply container means (8) for returning excess lubricant into said lubricant supply container means (8), said two-way valve (15) closing said auxiliary return conduit (16) for assuring a flow of lubricant through said main supply conduit means (14) under said critical flight conditions.

5. The system of claim 1, wherein said lubricant supply container means (8) comprise a venting conduit (18) operatively connecting said lubricant supply container means to said lubricant air separator means (6) for venting said lubricant supply container means through said lubricant air separator means.

6. The system of claim 1, wherein said conduit means (2') comprise lubricant cooling means (5) operatively connected between said suction pump means (4) and said lubricant air separator means.

7. The system of claim 1, wherein said lubricant air separator means comprises a lubricant outlet port operatively connected to an inlet port of said lubricant pressure pump means (1) by said return conduit means.

8. The system of claim 7, wherein said valve means in said return conduit means (11) comprise a non-return valve (21) for connecting and disconnecting said lubricant storage accumulator means (7) to said return conduit means (11) between said inlet port of said lubricant pressure pump means (1) and said lubricant outlet port of said lubricant air separator means (6), and wherein said auxiliary conduit means comprise an auxiliary supply conduit (12) and an auxiliary return conduit (16) connected between said supply container means (8) and said first valve means (15), said lubricant storage accumulator means comprising an outlet and a conduit (20) including a non-return valve (19) connecting said outlet of said lubricant storage accumulator means to said auxiliary return conduit (16) for venting said lubricant storage accumulator means into said lubricant supply container means (8).

* * * * *